3,433,816
PROCESS FOR WASHING FILTER CAKES
Eckart Müller, Ostliche Sandstrasse,
Bergen-Enkheim, Germany
No Drawing. Filed Sept. 10, 1964, Ser. No. 395,561
Claims priority, application Germany, Sept. 18, 1963,
M 58,237
U.S. Cl. 260—419
Int. Cl. C07c 7/14; C11c 1/08; B01d 37/00
14 Claims This invention relates to a process of separating a water immiscible mother liquor from a filter cake employing an intermediate solvent that is miscible both with the mother liquor and water.

Each separation of solid materials and liquids by filtration, in a narrow sense, by centrifuging or the like, yields a cake which contains a significant amount of incorporated fluid. The amount of liquid incorporated in the resulting cake depends first on the characteristics of the solid material, especially its capillarity and porosity, as well as on the duration and intensity of the mechanical separation of the liquid from the cake. In many cases, especially in separating the mother liquor from a crystalline slurry or paste, the solid material is not completely insoluble in the fluid. In such cases the amount of liquid contained in the cake following the initial separation of the mother liquor can certainly be reduced by pressing or sucking the liquid out of the cake with a temperature increase. The remaining filter cake is thereby more free from the undesired mother liquor than is possible without these means; however, the increased purity achieved in the filter cake is reduced by a significant drop in yield since by increasing the temperature part of the crystals are dissolved in the mother liquor again. The so-called Schwitz process makes use of this technique, especially for purifying solid hydrocarbons.

Fundamentally the same advantages and disadvantages apply to the increase in cost of the yield for the known process according to which the mother liquor incorporated in the cake is displaced by a more or less pure solvent which also dissolves part of the crystals in the cake. The use of this latter process, however, is practically limited for purifying crystal slurries or pastes to use where the solvent employed boils lower than the melting point of the crystals, since the mixture must be brought at least up to the boiling point of the molten crystals for separation of the solvent from the crystals. This causes very high heat costs, often causes thermal instability of the crystals and is also not technically possible.

Therefore, only through considerable technical expense was the mother liquor separated from the crystalline slurry to a suitable extent. Thus one had to be satisfied generally with a proper incomplete separation of the mother liquor which required a multistep countercurrent crystallization or a subsequent purification of the filter cake in other ways, for example, by distillation.

The present invention comprises a process for separating the mother liquor from a filter cake which is soluble in the mother liquor but insoluble in water. The preferred scope of application of the process includes, for example, the separation of mother liquors from p-xylene, naphthalene, anthracene, methyl naphthalene, paraffin, dinitrobenzene, dichlorobenzene and other halogenated aromatics, fatty acids, aromatic carboxylic acids, di- and tri-carboxylic acids, derivatives of mono- and polyvalent phenols and naphthols, toluene sulfochloride and other solid materials which are insoluble in water and which have a melting point lower than the boiling point of their mother liquor that is not miscible with water.

The approximate composition of some mother liquors and the compounding filter cakes, from which they are to be separated are given in the following tabulation below.

| Filter cake consisting of essentially pure— | Mother liquor consisting essentially of— |
|---|---|
| p-Xylene | o-Xylene, m-xylene, ethylbenzene. |
| Naphthalene | Tar oil cut boiling range 200–230° C. |
| Anthracene | Tar oil cut boiling range 330–360° C. |
| 2-methyl naphthalene | 1-methyl naphthalene. |
| Paraffin | Paraffin oil. |
| p-Dinitrobenzene | o- and m-dinitrobenzene. |
| p-Nitrotoluene | o- and m-nitrotoluene. |
| p-Dichlorobenzene | o- and m-dichlorobenzene. |
| Saturated fatty acids | Unsaturated fatty acids. |
| Saturated straight chain | Unsaturated or branched chain. |
| Fatty alcohols with 12–18 C-atoms per molecule | Fatty alcohols with 12–18 C-atoms per molecule. |
| p-Cresole | m-Cresole. |
| Propylen-bis(benzoic acid) | Benzene from extracting. |
| 4-methyl pyridine | 2- and 3-methyl pyridine. |
| p-Toluene sulfochloride | o- and m-toluene sulfochloride. |
| Menthol | Permint oil. |

According to the invention, first the mother liquor is displaced or removed from the cake by a solvent which is easily miscible both with the mother liquor and with water.

After the mother liquor is completely displaced by this intermediate solvent, the intermediate solvent itself is washed from the cake with pure water so that the liquid in the resulting crystalline slurry or paste is practically exclusively water. The separation of this water from the crystals can be carried out by known methods, for example, by simple melting and phase separation, e.g., in a simple separator or by drying in a heated stream of air.

The temperature at which the filter cake is washed is not very important. Of course the washing temperature must be below the melting point of the filter cake. Decreasing the washing temperature decreases the loss of crystals dissolved in the intermediate solvent, but usually demands an additional energy input.

Besides, the viscosity of the washing liquid increases with decreasing temperature, thereby prolonging the time necessary for washing, whereby the danger of dissolving crystals in the washing liquid is enhanced. For the reasons given it is preferred to do the washing at ambient room temperaure whenever possible, and at about 10° C. below the melting point of the filter cake if said melting point is below about 30° C.

Another feature of the invention is that the intermediate solvent is not pure but already mixed with water. Preferably, the water is added in such quantities that the intermediate solvent is still clearly miscible with the mother liquor. By this means the solubility of the crystals in the intermediate solvent is decreased so that the loss of crystals, which is already very small, by partially dissolving in the intermediate solvent can be further reduced.

The optimal amount of water addition depends on the properties of the intermediate solvent employed and of the mother liquor. The theoretical optimum corresponds to a water percentage, at which complete miscibility of the intermediate solvent with the mother liquor is just maintained so that surpassing this percentage would result in the formation of two liquid phases.

As, however it is imperative that such formation of two liquid phases is avoided, the water content of the intermediate solvent should be kept safely below this theoretically optimal upper limit. E.g. 10–15% $H_2O$ should be added to the methanol for washing a cake of durene, or 5–10% to the methanol used for washing p-xylene at −40° C. or 15–20% of water to the acetonitrile for washing the naphthalene.

The filtration is preferably carried out so that the filtrate, which contains the replaced mother liquor, the intermediate solvent and a part of the water necessary for displacement, is separated and collected from the major amount of the mother liquor.

The intermediate solvent is recovered from the wash filtrate by distillation and recycled back into the process.

According to a preferred embodiment of the invention this recovery by distillation was facilitated by suitable choice of intermediate solvent. If the mother liquor boils higher than water, as it is generally the case, an intermediate solvent is used whose boiling point is below 100° C. Suitable solvents for this purpose are lower alcohols, ketones and nitriles, preferably methanol, acetone and/or acetonitrile. In this case the recovery of the solvent is carried out with relatively small heat expenditure overhead since water and the mother liquor jointly accrue as the desired product.

If, on the other hand, the mother liquor employed boils below 100° C., then suitably an intermediate solvent is employed having a boiling point over 100° C. Then the recovery by distillation is carried out so that the water and the mother liquor are removed overhead as a mutual azeotrope while the pure intermediate solvent is recovered as the sump product. For this purpose suitable intermediate solvents are, for example, glycol, pyrrolidone and its derivatives.

The process of the invention is further described in the following examples which illustrate embodiments of the invention. The percentage figures employed in these examples and in the specification and claims is by weight unless otherwise specified.

EXAMPLE 1

1000 g. of a distillation cut from a platformate with a boiling range 190–200° C., forming a mixture of 20% durene (1,2,4,5-tetramethyl benzene and 80% other alkyl aromatics, mainly iso durene (1,2,3,4-tetramethyl benzene), and all isomers of methyl-sec.-butylbenzene, were cooled to −15° C. thereby crystallizing the durene from the mixture. The mixture was filtered at −15° C. and the resulting filter cake washed with 0.4 liter of methanol. Additionally the filter cake was washed with 0.3 liter of water. The recovered filter cake was heated to 85° C. whereby the cake melted and formed two phases. The heavy or lower phase contained 60 g. of water and the upper phase contained 120 g. of durene having a solidification point of 79.0° C. corresponding to a purity of 99%.

For comparison the process was repeated but the filtration was carried out without the inventive intermediate wash of the filter cake. The purity achieved was 50 to 60% durene which could not be increased by centrifuging to more than about 75%.

EXAMPLE 2

1000 g. of a p-xylene enriched $C_8$-cut from a platformate, consisting of a mixture of 50% p-xylene and 50% other $C_8$-aromatics, mainly o- and m-xylene and ethylbenzene, were cooled to −40° C. and p-xylene caused to crystallize. The crystal slurry was filtered at −40° C. The resulting filter cake was washed at −40° C. with 250 g. of methanol. Thereupon the filter cake was washed with 200 g. of water at +5° C. The total wash filtrate amounted to 470 g. The filter cake after melting was separated into 335 g. of 99% p-xylene and 65 g. of water.

Employing a normal filtration without use of intermediate washing of the filter cake according to the invention a cake was obtained containing 75% p-xylene. Also this purity could not be increased to higher than 90% by centrifuging.

EXAMPLE 3

1000 g. of naphthalene oil (tar oil cut, boiling range 200–230° C.) having a naphthalene content of about 60% were crystallized at 20° C. and filtered. The resulting filter cake was washed with 300 g. of acetone and additionally washed with 200 g. of water. 580 g. of filter cake was obtained. After melting 500 g. of naphthalene having a melting point of 79.8° C., corresponding to a purity of 99% naphthalene, and 80 g. of water were separated.

Repeating the process without the intermediate washing of the filter cake according to the invention yielded only naphthalene with a purity of 75 to 80%.

EXAMPLE 4

1000 g. of a mixture of natural fatty acids obtained by hydrolysis of a cottonseed oil, having 12 to 18 C-atoms per molecule, and consisting of 60% of saturated and 40% of unsaturated fatty acids, were cooled to +10° C. and thereby saturated fatty acids caused to crystallize. The crystal slurry was filtered at +10° C. The filter cake consisted of 500 g. solid saturated fatty acids in which 200 g. of the mother liquor having a composition of 80% of unsaturated and 20% of saturated fatty acids was incorporated.

This filter cake was washed at 20° C. with 400 g. acetonitrile, thereby dissolving the whole mother liquor and dissolving 50 g. of the saturated fatty acid crystals too. 150 g. of the acetonitrile remained after washing between the crystals of the filter cake. Thereupon the filter cake was washed with 300 g. of water, thereby eliminating the whole acetonitrile from the filter cake. This cake was molten at +50° C., whereby separation into two layers occurred. The upper layer consisted of 450 g. of saturated fatty acids containing only 0.5% of unsaturated acids. The lower layer consisted of 120 g. water.

The process was repeated with an intermdiate washing medium consisting of 360 g. of acetonitrile and 40 g. of water instead of 400 g. pure acetonitrile. The amount of fatty acid crystals dissolved by the acetonitrile decreased from 50 g. to 10 g. and therefore 490 g. of saturated fatty acids with the same purity were recovered.

EXAMPLE 5

1000 g. of a mixture of 48% p-toluene sulfochloride, 32% o-toluene sulfochloride and 20% of carbon tetrachloride recovered in an intermediate step in the production of saccharine (o-compound) and bactericides (p-compound) were cooled to −10° C. and the resulting crystal slurry filtered at −10° C. The solid residue on the filter consisted of 400 g. of p-toluene sulfochloride crystals incorporating 100 g. of the mother liquor having a composition of 33% of carbon tetrachloride, 54% o-toluene sulfochloride and 13% of p-toluene sulfochloride. The crystals were washed at −10° C. with 200 g. of carbon tetrachloride. Thereupon they were washed at +20° C. with 200 g. carbitol-solvent (diethylene glycol monoethyl ether) and furthermore washed with 200 g. water at 20° C. 380 g. of 98% pure p-toluene sulfochloride were recovered after melting at 70° C. and 150 g. water were separated.

EXAMPLE 6

1000 g. crude benzene having a benzene content of about 95%, the remaining 5% consisting essentially of toluene, thiophene, carbon disulfide, cyclohexane and several other nonaromatic hydrocarbons were cooled to −15° C., and 50% of the benzene caused to crystallize forming a slurry of high viscosity. This crystal slurry was filtered at −15° C., and 250 g. of filtrate were recovered while the other part of the mother liquor was incorporated between the crystals of the filter cake.

Thereupon the filter cake was washed at −5° C. with a mixture containing 360 g. of butylcellosolve (ethylene glycol monobutyl ether) and 40 g. water and additionally washed at +1° C. with 300 g. water.

The filter cake after melting was separated into 450 g. benzene of 99.95% purity and 180 g. water.

I claim:

1. In a process for separating water immiscible mother liquor from a filter cake consisting essentially of an organic compound insoluble in water and having a melting point lower than the boiling point of the mother liquor the improvement comprising respectively washing the filter cake with an intermediate organic solvent which is miscible both with the mother liquor and water, thereafter washing the filter cake with water, separating the water retained in the filter cake thereby producing an organic compound filter cake essentially free of mother liquor.

2. A process as in calim 1 wherein the filter cake consists essentially of durene and the intermediate organic solvent is methanol.

3. A process as in claim 1 wherein the filter cake consists essentially of p-xylene and the intermediate organic solvent is methanol.

4. A process as in claim 1 wherein the filter cake consists essentially of naphthalene and the intermediate organic solvent is acetone.

5. A process as in claim 1 wherein an amount of water is added to the intermediate organic solvent prior to washing the filter cake whereby the solubility of the filter cake is decreased and the miscibility of the intermediate organic solvent with the mother liquor is maintained.

6. A process as in claim 1 further comprising collecting the filtrate resulting from washing the filter cake with the intermediate organic solvent and comprising the mother liquor, the intermediate organic solvent and water and recovering the intermediate organic solvent by fractionally distilling the filtrate.

7. A process as in claim 6 wherein the intermediate organic solvent boils over 100° C. and the mother liquor boils below 100° C.

8. A process as in claim 6 wherein the intermediate organic solvent boils below 100° C. and the mother liquor boils above 100° C.

9. In a process for producing durene having a purity of about 99% and for separating water immiscible mother liquor from a hydrocarbon mixture insoluble in water consisting essentially of about 20% durene and about 80% iso-durene, methyl-sec.-butylbenzene and other alkyl aromatic hydrocarbons, the improvement comprising respectively in combination (a) cooling the hydrocarbon mixture to about −15° C. to crystallize durene therefrom, (b) filtering the durene from the mixture at about −15° C. to produce a durene filter cake, (c) washing the durene filter cake with methanol, (d) then washing the durene filter cake with water, (e) heating the resulting washed cake until it melts at about 85° C. form an upper phase and a lower phase, and (f) recovering durene from the upper phase to form durene having a purity of about 99%.

10. In a process for producing p-xylene having a purity of about 99% and for separating water immiscible mother liquor from a hydrocarbon mixture insoluble in water consisting essentially of about 50% p-xylene and about 50% o-xylene, m-xylene, ethyl benzene and other alkyl aromatic hydrocarbons, the improvement comprising respectively in combination:

(a) cooling the hydrocarbon mixture to about −40° C. to crystallize p-xylene therefrom, (b) filtering the p-xylene from said mixture at about −40° C. to produce a p-xylene filter cake, (c) washing the p-xylene filter cake at about −40° C. with methanol, (d) then washing the p-xylene filter cake at about +5° C. with water, (e) heating the resulting filter cake until it melts, and (f) recovering the p-xylene therefrom having a purity of about 99%.

11. In a process for producing naphthalene having a purity of about 99% and for separating water immiscible mother liquor from a hydrocarbon mixture insoluble in water consisting essentially of 60% naphthalene and about 40% of other tar oil components boiling in the range of 200° to 230° C., the improvement comprising respectively in combination:

(a) cooling the hydrocarbon mixture to about 20° C. to crystallize naphthalene therefrom, (b) filtering the naphthalene from said mixture to produce a naphthalene filter cake, (c) washing the naphthalene filter cake with acetone, (d) then washing the naphthalene filter cake with water, (e) heating the resulting filter cake until it melts, and (f) recovering the naphthalene therefrom having a purity of about 99%.

12. In a process for producing saturated fatty acids containing only about 0.5% unsaturated fatty acids and for separating water immiscible mother liquor from a mixture of natural fatty acids consisting essentially of about 60% saturated fatty acids and about 40% unsaturated fatty acids, the improvement comprising respectively in combination;

(a) cooling the mixture of natural fatty acids to about 10° C. to crystallize saturated fatty acids therefrom, (b) filtering resulting crystals from the mixture at about +10° C. to produce a saturated fatty acid filter cake, (c) washing the said filter cake with acetonitrile to remove remaining unsaturated fatty acids from the filter cake, (d) washing the resulting cake with water, (e) heating the washed cake until it melts at about 50° C. to produce an upper phase and lower phase, and (f) recovering saturated fatty acids from the upper phase to produce saturated fatty acids containing about 0.5% of unsaturated fatty acids.

13. In a process for producing p-toluene sulfochloride having a purity of about 98% and for separating mother liquor from a mixture consisting essentially of about 48% p-toluene sulfochloride, about 32% o-toluene sulfochloride and about 20% carbon tetrachloride, the improvement comprising respectively in combination:

(a) cooling the mixture to about −10° C. to crystallize p-toluene sulfochloride therefrom, (b) filtering the resulting crystals from the mixture to produce a p-toluene sulfochloride filter cake, (c) washing the filter cake with carbon tetrachloride at about −10° C., (d) washing the filter cake with diethylene glycol monoethyl ether at about 20° C. and then (e) washing the filter cake with water at about 20° C., (f) heating the washed cake until it melts at about 70° C., and (g) recovering p-toluene sulfochloride therefrom having a purity of about 98%.

14. A process for producing benzene having a purity of about 99.95% and for separating mother liquor from a mixture consisting essentially of about 95% benzene and the remainder minor proportions of toluene, thiophene, carbon disulfide, cyclohexane, and nonaromatic hydrocarbons, the improvement comprising respectively in combination:

(a) cooling the mixture to about −15° C. to crystallize benzene therefrom, (b) filtering the resulting crystals from the mixture to produce a benzene filter cake, (c) washing the filter cake at about −5° C. with a mixture of ethylene glycol monobutyl ether and water in the ratio respectively, in parts by weight, of about 9 to 1, then (d) washing the filter cake at about 1° C. with water,
(e) heating the washed cake until it melts, and
(f) recovering benzene therefrom having a purity of about 99.95%.

References Cited

UNITED STATES PATENTS

| | | | |
|---|---|---|---|
| 1,693,417 | 11/1928 | Wait | 210—67 |
| 2,858,348 | 10/1958 | Bosmajian | 260—674 |

FOREIGN PATENTS 225,429  6/1927  Great Britain.

DELBERT E. GANTZ, *Primary Examiner.*

C. E. SPRESSER, *Assistant Examiner.*

U.S. Cl. X.R.

210—66, 67; 260—543, 674, 707